(12) United States Patent
Saitou et al.

(10) Patent No.: US 10,416,449 B2
(45) Date of Patent: Sep. 17, 2019

(54) DISPLAY APPARATUS HAVING MOVING MECHANISM

(71) Applicants: PIONEER CORPORATION, Bunkyo-ku, Tokyo (JP); TOHOKU PIONEER CORPORATION, Tendo-shi, Yamagata (JP)

(72) Inventors: Kazuhiro Saitou, Tendo (JP); Kenji Kawamura, Tendo (JP); Shinji Sato, Tendo (JP); Tomohiro Adachi, Tendo (JP); Toru Suzuki, Tendo (JP)

(73) Assignees: PIONEER CORPORATION, Tokyo (JP); TOHOKU PIONEER CORPORATION, Yamagata (JP)

( * ) Notice: Subject to any disclaimer, the term of this patent is extended or adjusted under 35 U.S.C. 154(b) by 0 days.

(21) Appl. No.: 15/739,446

(22) PCT Filed: Feb. 25, 2016

(86) PCT No.: PCT/JP2016/055571
§ 371 (c)(1),
(2) Date: Dec. 22, 2017

(87) PCT Pub. No.: WO2016/208221
PCT Pub. Date: Dec. 29, 2016

(65) Prior Publication Data
US 2018/0180881 A1 Jun. 28, 2018

(30) Foreign Application Priority Data
Jun. 24, 2015 (JP) ................................ 2015-126410

(51) Int. Cl.
*G02B 27/01* (2006.01)
*B60K 35/00* (2006.01)
(Continued)

(52) U.S. Cl.
CPC .......... *G02B 27/0149* (2013.01); *B60K 35/00* (2013.01); *B60K 37/00* (2013.01);
(Continued)

(58) Field of Classification Search
CPC ........ G02B 27/0149; G02B 2027/0154; G02B 2027/0159; G02B 2027/0161; G02B 2027/0165; G02B 2027/0169
See application file for complete search history.

(56) References Cited

U.S. PATENT DOCUMENTS 5,677,701 A * 10/1997 Okuyama .............. B60K 37/02
345/7
5,847,685 A * 12/1998 Otsuki ................... B60K 35/00
345/87

(Continued)

FOREIGN PATENT DOCUMENTS

EP 3279023 A1 2/2018
JP 04-136929 U1 12/1992
(Continued)

OTHER PUBLICATIONS

Notice of Rejection for JP App No. 2017-524659 dated Sep. 11, 2018, 8 pgs.

(Continued)

*Primary Examiner* — Bao-Luan Q Le
(74) *Attorney, Agent, or Firm* — Procopio, Cory, Hargreaves & Savitch LLP

(57) ABSTRACT

A display apparatus includes: a housing including a top plate having an opening and two opposed side plate units; a display member capable of moving through the opening; a shutter configured to open and close the opening; and a moving mechanism provided on at least one of the two side plate units, the moving mechanism including a first slide member and a second slide member each moving along the (Continued)

at least one side plate unit and a transmission member transmitting an amount of movement of the first slide member to the second slide member while increasing the amount of movement, wherein the shutter moves according to movement of the second slide member.

9 Claims, 10 Drawing Sheets

(51) Int. Cl.
    *B60K 37/00* (2006.01)
    *B60R 11/02* (2006.01)
    *B60K 37/02* (2006.01)
(52) U.S. Cl.
    CPC .............. *B60R 11/02* (2013.01); *G02B 27/01* (2013.01); *B60K 37/02* (2013.01); *B60K 2370/155* (2019.05); *B60K 2370/31* (2019.05); *B60K 2370/33* (2019.05); *B60K 2370/334* (2019.05); *B60K 2370/40* (2019.05); *B60K 2370/67* (2019.05); *G02B 2027/0154* (2013.01); *G02B 2027/0159* (2013.01); *G02B 2027/0161* (2013.01); *G02B 2027/0165* (2013.01); *G02B 2027/0169* (2013.01)

(56) References Cited

U.S. PATENT DOCUMENTS

| | | | | |
|---|---|---|---|---|
| 6,011,685 A * | 1/2000 | Otsuki | ............... | B60K 35/00 340/980 |
| 6,012,785 A * | 1/2000 | Kawasaki | ............... | B60K 37/00 312/29 |
| 6,049,288 A * | 4/2000 | Kawasaki | ............... | B60K 37/00 340/815.4 |
| 7,234,746 B2 * | 6/2007 | Sakakibara | ............... | B60R 7/04 296/24.34 |
| 7,554,062 B2 * | 6/2009 | Lee | ............... | B41J 3/46 219/414 |
| 7,936,518 B2 * | 5/2011 | Takahashi | ............... | G02B 27/01 359/630 |
| 8,077,396 B2 * | 12/2011 | Croy | ............... | B60K 35/00 359/632 |
| 9,063,327 B2 * | 6/2015 | Moussa | ............... | G02B 7/1821 |
| 9,400,388 B2 * | 7/2016 | Yamada | ............... | B60K 35/00 |
| 9,494,796 B2 * | 11/2016 | Ishibashi | ............... | B60K 35/00 |
| 9,690,096 B2 * | 6/2017 | Koseki | ............... | G02B 27/0101 |
| 9,910,280 B2 * | 3/2018 | Yomogita | ............... | G02B 27/0149 |
| 2006/0012202 A1 * | 1/2006 | Sakakibara | ............... | B60R 7/04 296/24.34 |
| 2006/0219702 A1 * | 10/2006 | Lee | ............... | B41J 3/46 219/506 |
| 2010/0046082 A1 * | 2/2010 | Croy | ............... | B60K 35/00 359/632 |
| 2010/0067118 A1 * | 3/2010 | Takahashi | ............... | G02B 27/01 359/633 |
| 2013/0194518 A1 * | 8/2013 | Moussa | ............... | G02B 7/1821 349/11 |
| 2014/0368097 A1 * | 12/2014 | Yomogita | ............... | G02B 27/0149 312/23 |
| 2015/0055098 A1 * | 2/2015 | Ishibashi | ............... | B60K 35/00 353/14 |
| 2015/0070771 A1 | 3/2015 | Jeon et al. | | |
| 2015/0116837 A1 * | 4/2015 | Yamada | ............... | B60K 35/00 359/632 |
| 2015/0146299 A1 * | 5/2015 | Koseki | ............... | G02B 27/0101 359/632 |

FOREIGN PATENT DOCUMENTS

| | | |
|---|---|---|
| JP | 2014205376 | 10/2014 |
| JP | 2014-226961 A | 12/2014 |
| JP | 2015000710 A | 1/2015 |
| WO | 2014163077 A1 | 10/2014 |

OTHER PUBLICATIONS

International Search Report and Written Opinion for related PCT application No. PCT/JP2016/055571 dated Apr. 26, 2016. English translation provided.
Extended European Search Report for related EP App No. 16813992.1 dated Nov. 22, 2018.

* cited by examiner

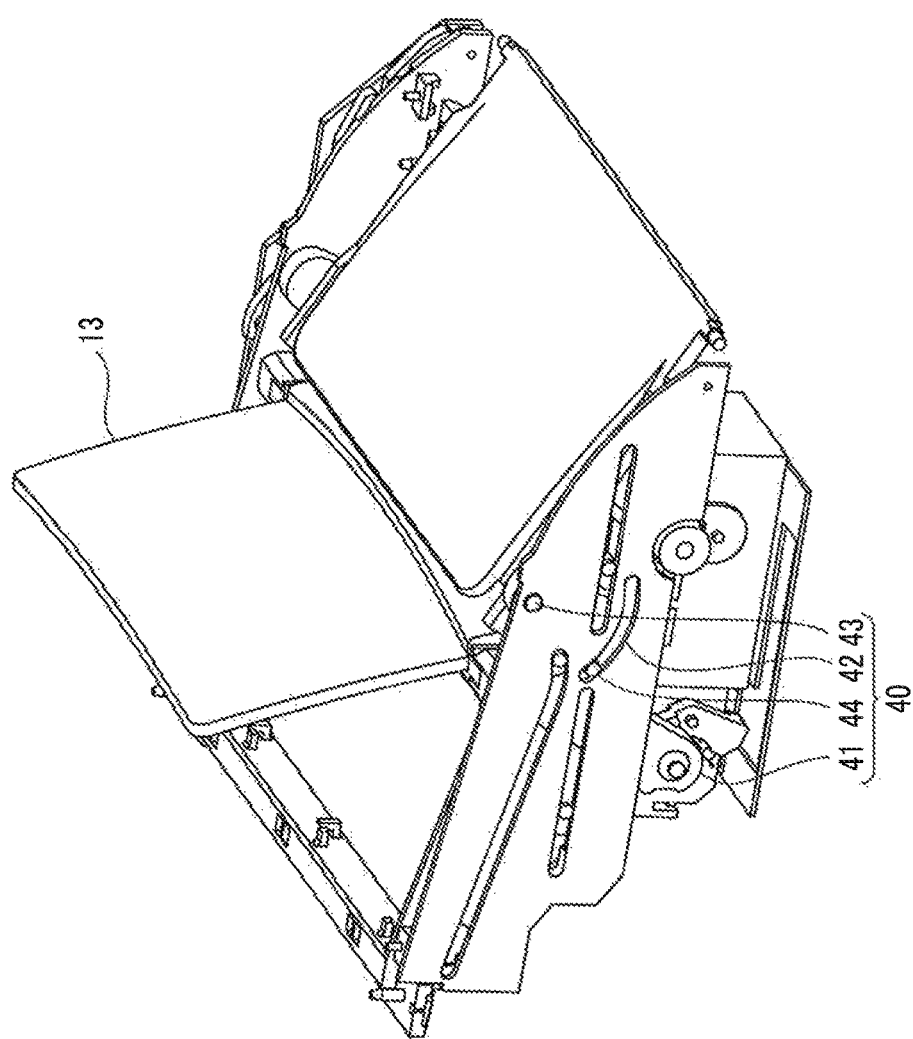

DISPLAY APPARATUS HAVING MOVING MECHANISM

CROSS-REFERENCE TO RELATED APPLICATIONS

This application is a U.S. National Stage entry of PCT Application No. PCT/JP2016/055571, filed on Feb. 25, 2016, which claims priority to the Japanese Patent Application Np.:JP2015-126410 filed on Jun. 24,2015 the entire contents of which are hereby incorporated by reference.

TECHNICAL FIELD

The present invention relates to a display apparatus.

BACKGROUND ART

In recent years, head-up displays have started being mounted, for example, near a driver's seat of a vehicle. An example of a head-up display is a display apparatus that displays own vehicle information, road information, navigation information, and the like on a translucent display member called image combiner (hereinafter, referred to simply as a combiner). For example, the head-up display displays the above-mentioned driving support information as a virtual image in front of the windshield. The driving support information is visually recognized by the driver as if superimposed on the landscape in front of the vehicle. The head-up display can thus provide the driving support information for the driver without the driver often moving his/her line of sight.

For example, Patent Literature 1 discloses a vehicle display apparatus including a combiner moving mechanism that lifts up and down a combiner between a developed position and a retracted position by performing a bending operation or extending operation of a link mechanism including a combiner holder and a rotating arm.

CITATION LIST

Patent Literature

Patent Literature 1: Japanese Patent Application Laid-Open No. 2014-205376

SUMMARY OF INVENTION

Technical Problem

For example, a head-up display is mounted on a vehicle's dashboard in an embedded manner. For example, the head-up display includes a housing which accommodates a combiner. For example, the combiner is moved (developed) from the housing to above the dashboard when in operation (for example, during driving of the vehicle). For example, an area serving as a path of irradiation light to the combiner when in operation is provided in the housing.

For example, an opening for moving the foregoing combiner and an opening intended for the optical path of the irradiation light to the combiner are formed in the top surface of the housing. However, such openings in the housing expose the interior of the housing. For example, if the exposed parts in the housing are irradiated with sunlight or if a foreign substance gets into the housing, the parts in the housing can degrade or break early.

The present invention has been achieved in view of the foregoing, and an example of an object thereof is to provide a display apparatus that can move a shutter to close an opening of a housing with space saved.

Solution to Problem

A display apparatus according to claim 1 includes: a housing including a top plate having an opening and two opposed side plate units; a display member capable of moving through the opening; a shutter configured to open and close the opening; and a moving mechanism provided on at least one of the two side plate units, the moving mechanism including a first slide member and a second slide member each moving along the at least one side plate unit and a transmission member transmitting an amount of movement of the first slide member to the second slide member while increasing the amount of movement, wherein the shutter moves according to movement of the second slide member.

BRIEF DESCRIPTION OF DRAWINGS

FIG. 10 is a perspective view of the rotating mechanism with the display member of the display apparatus according to the first embodiment at a developed position.

DESCRIPTION OF EMBODIMENTS

An embodiment of the present invention will be described in detail below.

First Embodiment

Figure 1:
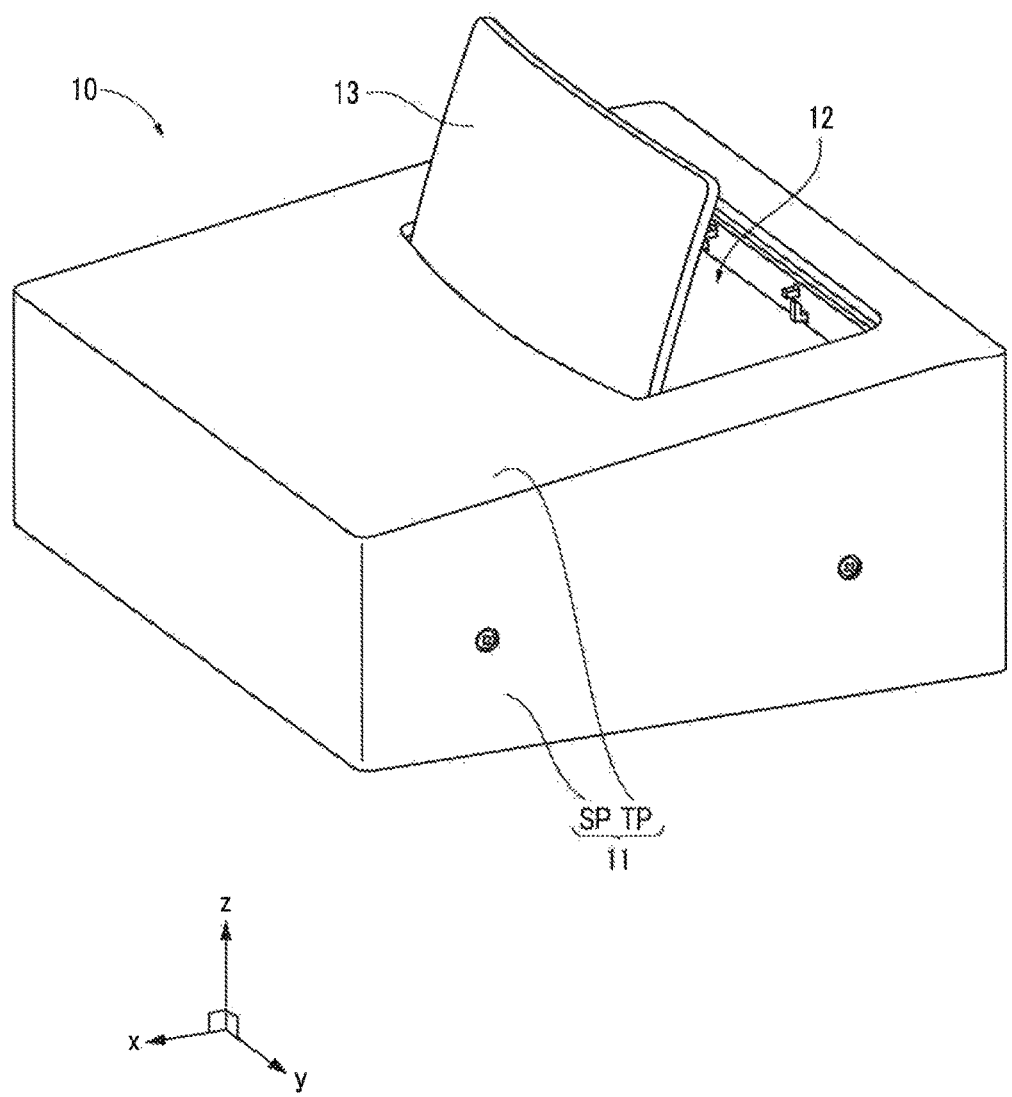
FIG. 1 is a perspective view of a display apparatus according to a first embodiment when in a display operation.

FIG. 1 is a perspective view of a display apparatus 10 according to a first embodiment. FIG. 1 shows the display apparatus 10 when in a display operation (hereinafter, referred to simply as in operation). For example, the display apparatus 10 is a head-up display. For example, the display apparatus 10 is mounted on a dashboard of a four-wheel vehicle and the like. The display apparatus 10 includes a housing 11. The housing 11 includes a top plate TP which has an opening 12. In the present embodiment, the top plate TP has a substantially flat shape or a smoothly curved shape.

The housing 11 includes side plate units SP which extend in a depth direction of the top plate TP beside the top plate TP. The side plate units SP are provided on mutually-opposed both side surfaces of the housing 11. The side plate units SP constitute the side surfaces of the housing 11. The two side plate units SP are arranged opposite to each other. The depth direction of the top plate TP coincides with the depth direction of the housing 11.

The display apparatus 10 includes a display member 13. In the present embodiment, the display member 13 has translucency. An example of the display member 13 is an image combiner. For example, the display member 13 is a slightly curved plate-like member. As shown in FIG. 1, the display member 13 is protruded from the housing 11 through the opening 12 of the housing 11 when in operation (for example, during driving of the vehicle). As employed herein, the position of the display member 13 in operation, shown in FIG. 1, will be referred to as a developed position.

For example, the display apparatus 10 is connected to a detection apparatus (not shown) which detects a position, speed, moving direction, peripheral situation, and the like of the vehicle on which the display apparatus 10 is mounted. For example, the display apparatus 10 is connected to a navigation apparatus (not shown) mounted on the vehicle. For example, driving support information (such as information indicating the speed of the own vehicle, a distance to a preceding vehicle, and instructions for left and right turns at intersections) based on information input from the detection apparatus, the navigation apparatus, and the like is displayed on the display member 13 in operation.

As employed herein, the extending direction of the side plate units SP will be referred to as the depth direction (x-axis direction) of the housing 11. The opposing direction of the mutually-opposed side plate units SP will be referred to as a width direction (y-axis direction) of the housing 11. A direction orthogonal to both the depth direction and the width direction of the housing 11 will be referred to as a height direction (z-axis direction) of the housing 11. If the display apparatus 10 is mounted on the dashboard of the vehicle, the windshield is located behind (on the far side) of the display apparatus 10 in the x-axis direction. As employed herein, behind in the x-axis direction refers to the direction of the arrow of the x-axis in the diagram.

Figure 2:
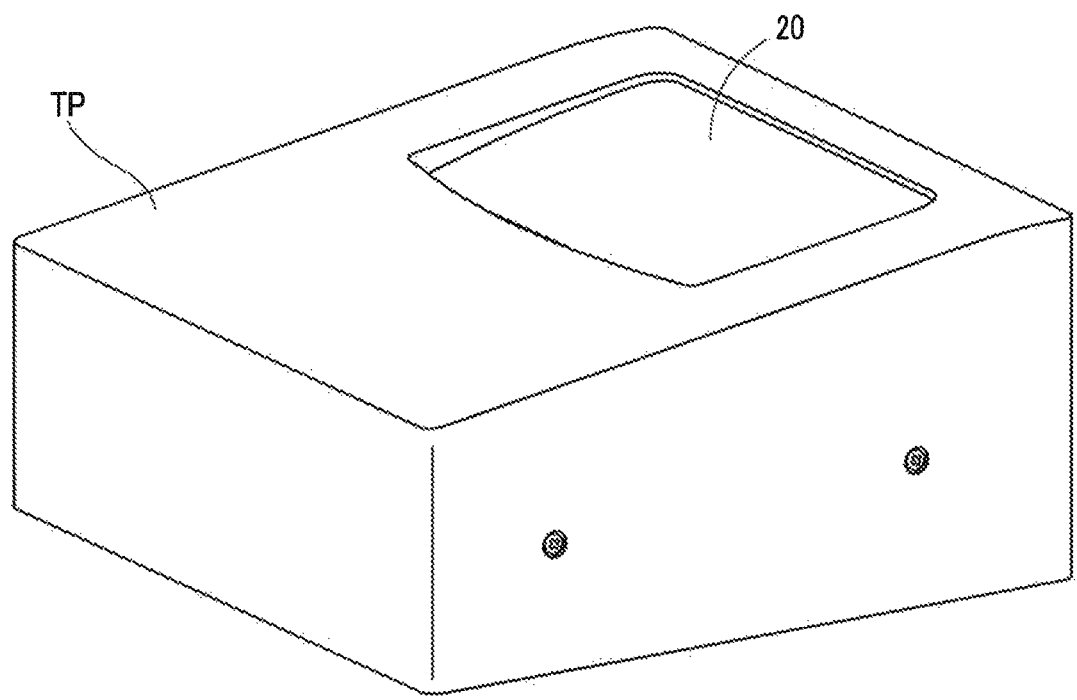
FIG. 2 is a perspective view of the display apparatus according to the first embodiment when not in a display operation.

FIG. 2 is a perspective view of the display apparatus 10 when not in a display operation (hereinafter, referred to as when not in operation). The display apparatus 10 includes a shutter 20 which opens and closes the opening 12. The shutter 20 has a light shielding property. In the present embodiment, the shutter 20 has a substantially flat plate shape. When in operation (in the state shown in FIG. 1), the shutter 20 is accommodated in the housing 11 to open the opening 12. On the other hand, when the display member 13 is retracted in the housing 11, the shutter 20 closes the opening 12.

More specifically, for example, before power-on (before the engine of the vehicle is started), the display member 13 is retracted in the housing 11 and the opening 12 is closed by the shutter 20. Next, immediately after power-on, the shutter 20 starts to open the opening 12. Next, if the opening 12 is detected to be fully opened by the shutter 20, the display member 13 starts to move through the opening 12. After the display member 13 moves to the developed position, a display operation is started. When the power is turned off, the display member 13 is retracted into the housing 11 and then the shutter 20 closes the opening 12.

In other words, the display member 13 moves between a retracted position at which the display member 13 is retracted in the housing 11 and the developed position at which the display member 13 is protruded from the opening 12. The shutter 20 moves between an open position at which the shutter 20 opens the opening 12 and a closed position (the state shown in FIG. 2) at which the shutter 20 closes the opening 12. In the present embodiment, the closed position refers to the position where the shutter 20 is moved to the near side. The open position refers to the position where the shutter 20 is moved to the far side. In the present embodiment, the shutter 20 is accommodated in the housing 11 and moves in the depth direction of the housing 11 in inside the housing 11. The shutter 20 opens and closes the opening 12 from inside the housing 11.

Figure 3:
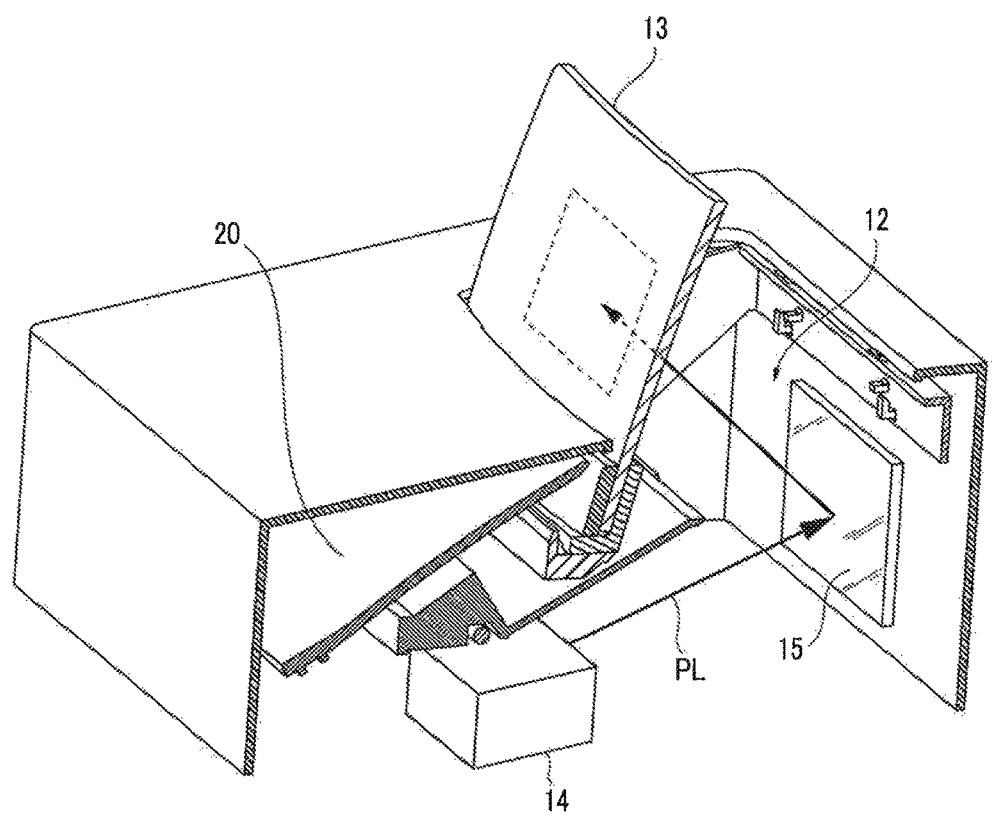
FIG. 3 is a diagram schematically showing an internal structure of the display apparatus according to the first embodiment.

FIG. 3 is a diagram schematically showing an internal structure of the display apparatus 10 when in operation, i.e., in a state in which the shutter 20 is moved to the open position and the display member 13 is moved to the developed position. In the present embodiment, the shutter 20 is retracted to behind (the far side of) the display member 13. The display apparatus 10 includes a light source 14 and a reflection member 15 which are accommodated in the housing 11.

For example, the light source 14 generates irradiation light PL to be incident on the display member 13 on the basis of the information input from the detection apparatus and the navigation apparatus. The reflection member 15 reflects the irradiation light PL toward the display member 13. The irradiation light PL is made incident on an incident surface (surface to be irradiated) of the display member 13 from the near side of the display member 13. The irradiation light PL incident on the display member 13 forms a virtual image behind the display member 13. In the present embodiment, the opening 12 is formed in a near-side area of the top plate TP.

As shown in FIG. 3, the irradiation light PL is incident on the display member 13 through the opening 12. More specifically, the opening 12 has a predetermined size and shape such that the irradiation light PL can pass, and forms an optical path of the irradiation light PL to the display member 13. In other words, the opening 12 serves as both a moving path (gateway) of the display member 13 and the optical path of the irradiation light PL to the display member 13.

Figure 4:
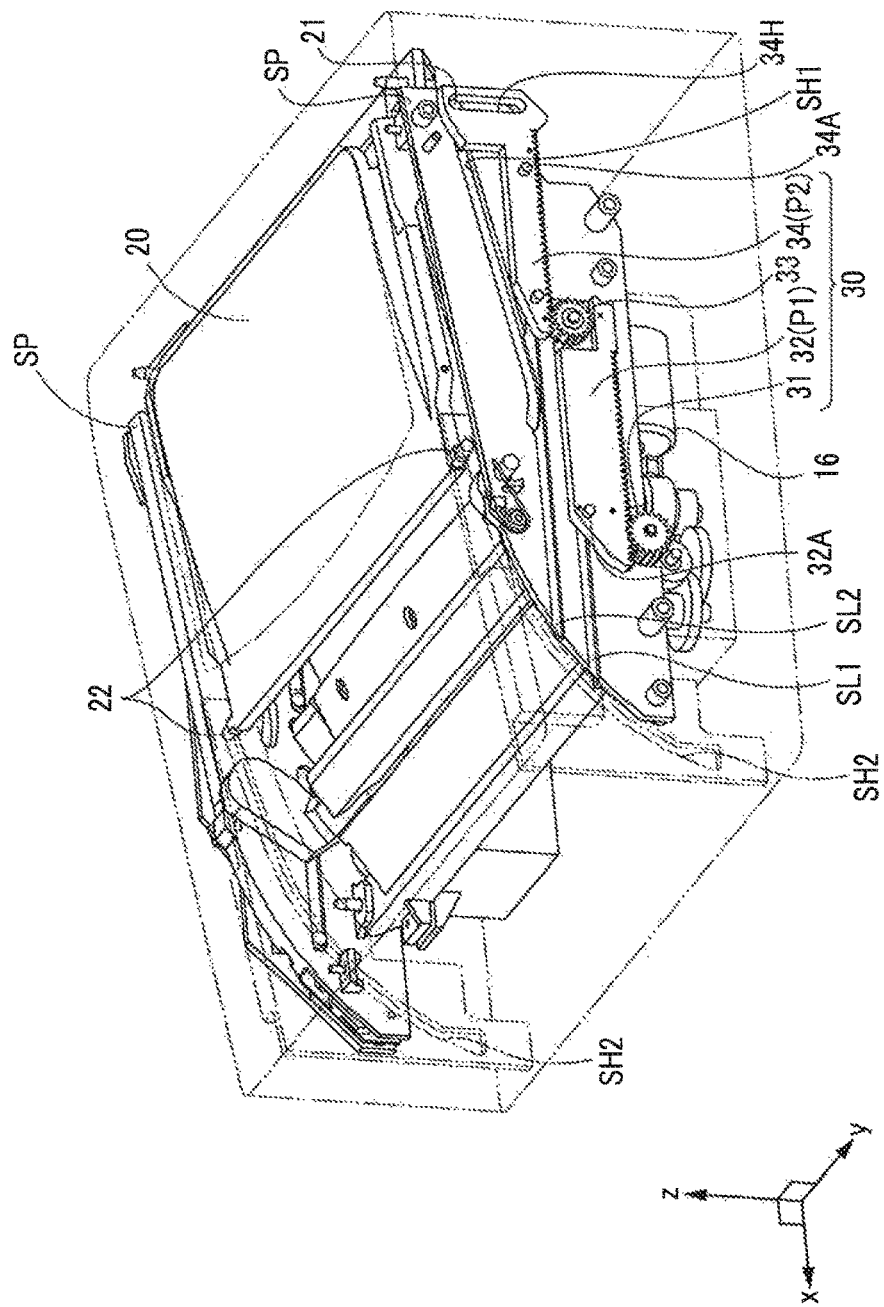
FIG. 4 is a perspective view of a moving mechanism with a shutter of the display apparatus according to the first embodiment at a closed position.
Figure 5:
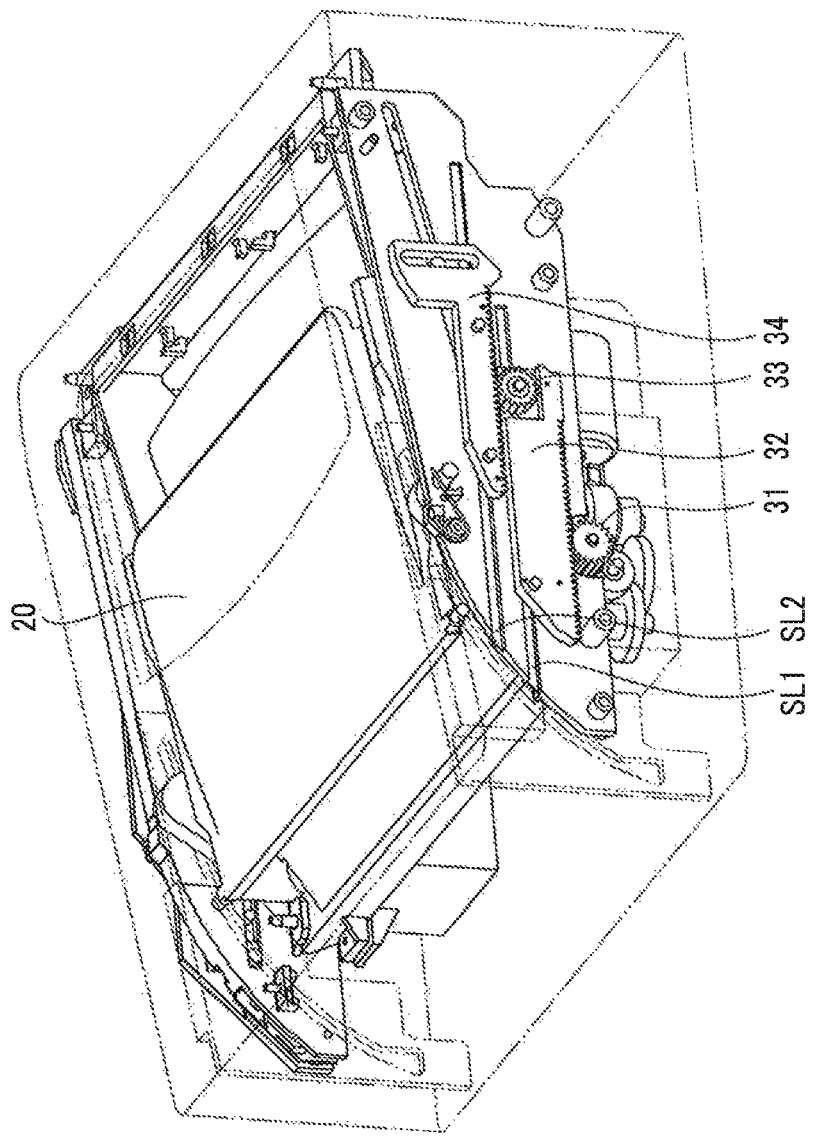
FIG. 5 is a perspective view of the moving mechanism with the shutter of the display apparatus according to the first embodiment in the process of opening or closing.
Figure 6:
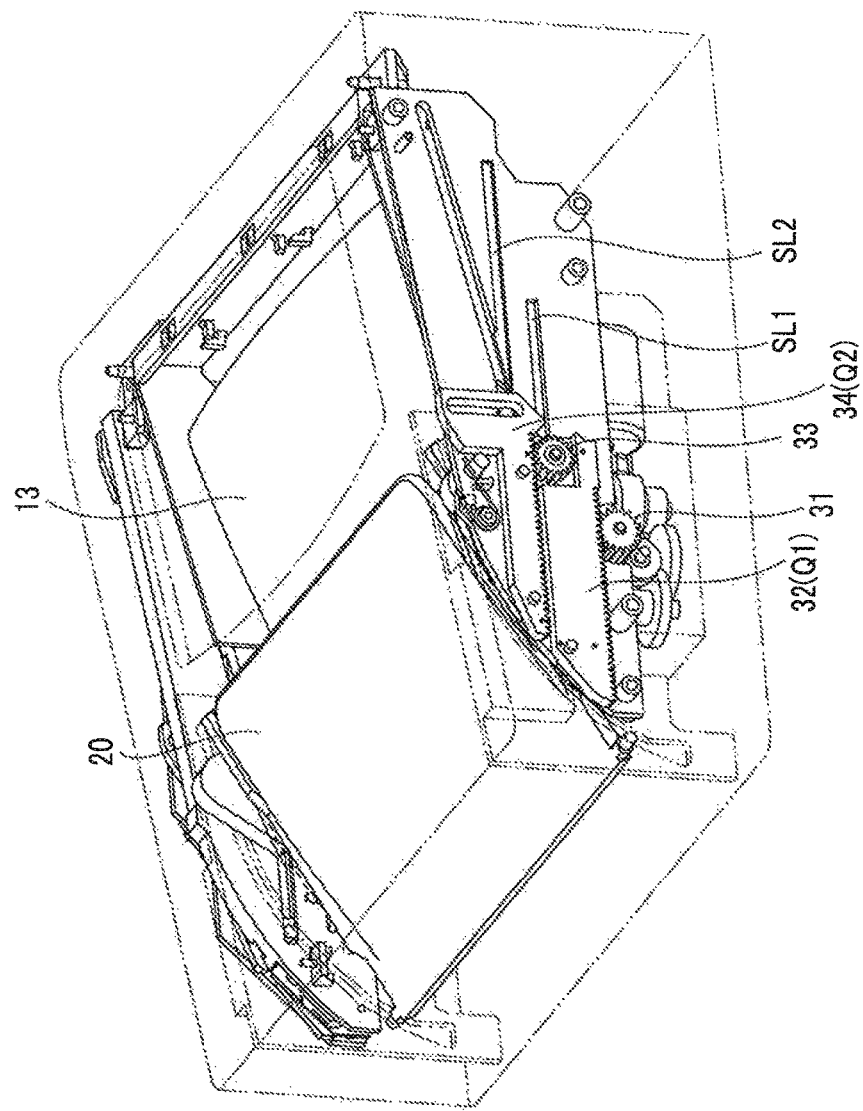
FIG. 6 is a perspective view of the moving mechanism with the shutter of the display apparatus according to the first embodiment at an open position.

Next, a moving mechanism 30 of the shutter 20 accommodated in the housing 11 will be described with reference to FIGS. 4 to 6. FIGS. 4 to 6 are perspective views of the display apparatus 10 before, after, and during movement of the shutter 20. In FIGS. 4 to 6, the housing 11 is shown in two-dotted dashed lines. FIG. 4 is a perspective view showing the moving mechanism 30 of the shutter 20 with the shutter 20 at the closed position. The shutter 20 and the moving mechanism 30 thereof will be initially described with reference to FIG. 4.

First and second shutter rails SH1 and SH2 are provided on each of the mutually-opposed side plate units SP of the housing 11. The shutter 20 moves on a track along the first and second shutter rails SH1 and SH2. The first and second shutter rails SH1 and SH2 are formed as grooves in the mutually-opposed side plate units SP of the housing 11. The first shutter rails SH1 are formed in the same shape in the respective side plate units SP and arranged opposite to each other. Similarly, the second shutter rails SH2 are formed in the same shape in the respective side plate units SP and arranged opposite to each other.

The shutter 20 includes first and second shutter pins 21 and 22 which are inserted into the first and second shutter rails SH1 and SH2, respectively. In the present embodiment, the first and second shutter pins 21 and 22 are cylindrical portions protruding from the end portions of the shutter 20 toward the side plate units SP. In the present embodiment, the first and second shutter pins 21 and 22 are formed on both ends of each of the side portions of the shutter 20 opposed to the side plate units SP.

In the present embodiment, the first shutter pins 21 are shutter pins arranged on the near side of the second shutter pins 22. The first shutter pins 21 move along the first shutter rails SH1. The second shutter pins 22 move along the second shutter rails SH2. The movement of the first and second shutter pins 21 and 22 makes the shutter 20 slide back and forth along the top plate TP of the housing 11.

In the present embodiment, the second shutter rails SH2 are formed in an arc shape in the side plate units SP. The shutter 20 therefore moves on an arcuate track in part. In other words, the shutter 20 rotates while moving along the top plate TP (translating according to an operation of the moving mechanism 30). More specifically, the shutter 20 rotates and moves immediately after movement from the open position. The shutter 20 then becomes substantially parallel to the top plate TP in the process of opening and closing, and moves along the top plate TP to close the opening 12.

Next, the moving mechanism 30 of the shutter 20 will be described. The moving mechanism 30 is provided on at least either one of the two mutually-opposed side plate units SP of the housing 11, and moves the shutter 20 by using driving force of a driving source 16. In the present embodiment, moving mechanisms 30 are provided on both of the two opposed side plate units SP. The display apparatus 10 includes the driving source 16 which is accommodated in the housing 11 and drives the moving mechanisms 30. For example, the driving source 16 includes a motor for generating the driving force. The moving mechanisms 30 include gears (first pinion gears) 31 to be rotated by the driving source 16. Specifically, a shaft (not shown) extending across the side plate units SP is connected to the driving source 16. The gears 31 are provided on both ends of the shaft. The driving force of the driving source 16 is transmitted to the gears 31, and the gears 31 rotate to transmit the driving force to the moving mechanisms 30. The moving mechanisms 30 move the shutter 20 by the transmitted driving force.

The moving mechanisms 30 include first and second slide members 32 and 34 which move along the side plate units SP. The moving mechanisms 30 include transmission members 33 which transmit the driving force of the first slide members 32 to the second slide members 34. The first and second slide members 32 and 34 make a sliding movement along the side plate units SP. More specifically, first and second slide rails SL1 and SL2 extending in the depth direction (front to rear) of the housing 11 are provided on the side plate units SP. The first and second slide members 32 and 34 include first and second slide pins 32A and 34A which are inserted into the first and second slide rails SL1 and SL2, respectively. A plurality of first slide pins 32A and a plurality of second slide pins 34A are provided on the first and second slide members 32 and 34, respectively.

The driving force is transmitted from the gears 31 rotated by the driving source 16 to the first slide members 32, whereby the first slide members 32 slide along the first slide rails SL1. The second slide members 34 slide along the second slide rails SL2. In the present embodiment, the first and second slide members 32 and 34 make a sliding movement in the depth direction (x-axis direction) of the housing 11.

The transmission members 33 transmit the amount of movement of the first slide members 32 to the second slide members 34 while increasing the amount of movement. Specifically, the transmission members 33 move the second slide members 34 relative to the first slide members 32 to amplify (increase) the amount of movement of the second slide members 34. More specifically, the first slide members 32 initially make a sliding movement, for example, from a position P1 before the sliding movement (FIG. 4) to a position Q1 (FIG. 6) according to the rotation of the gears 31. The length from the position P1 to the position Q1 for the first slide members 32 to move will be referred to as a length L.

In the present embodiment, the transmission members 33 include gears (second pinion gears) which rotate and of which rotation axes translate according to the movement of the first slide members 32. The gears serving as the transmission members 33 make translation and rotating motion to move the second slide members 34 relative to the first slide members 32. Here, the second slide members 34 slides and moves from a position P2 before the movement (FIG. 4) to a position Q2 (FIG. 6) that is separated by a length (X (times)×L). Here, X is a number greater than 1. X may be an integer such as 2 and 3, or a decimal fraction such as 1.1 and 1.5. In such a manner, the transmission members 33 move the second slide members 34 by an amount of movement obtained by increasing the amount of movement of the first slide members 32. The first slide members 32 and the second slide members 34 both simultaneously move relative to the side plate units SP while moving toward or away from each other.

The second slide members 34 have guide holes 34H into which the first shutter pins 21 of the shutter 20 are inserted. In the present embodiment, the guide holes 34H are formed in the second slide members 34 as long holes extending in the height direction (z-axis direction) of the housing 11. The first shutter pins 21 are inserted into (caught in) both the first shutter rails SH1 and the guide holes 34H. As the second slide members 34 slide, the first shutter pins 21 are moved along the first shutter rails SH1. That is, the shutter 20 moves according to the movement of the second slide members 34.

Next, an opening and closing operation of the shutter 20 will be described with reference to FIGS. 4 to 6. As shown in FIG. 4, when not in operation, the shutter 20 lies in the closed position at which the shutter 20 closes the opening 12. The opening 12 is thus fully closed by the shutter 20. If the display apparatus 10 is powered on, the motor 16 serving as the driving source becomes conducting and the moving mechanisms 30 start driving.

FIG. 5 is a perspective view of the display apparatus 10 in a state in which the shutter 20 is in the process of opening or closing (in the process of transition between the open position and the closed position). If the moving mechanisms 30 are driven, the shutter 20 moves backward. More specifically, the rotation of the gears 31 causes the first and second slide members 32 and 34 to make a sliding movement. The shutter 20 moves according to the movement of the second slide members 34. In such a state, the opening 12 is partially open.

FIG. 6 is a perspective view of the display apparatus 10 in a state in which the shutter 20 is moved to the open position. The shutter 20 stops at the position where the opening 12 is fully open. In such a manner, the shutter 20 performs the opening and closing operation of the opening 12. In the present embodiment, the shutter 20 is configured to move under the top plate TP, along the top plate TP. The shutter 20 is configured to lift slightly up and down when closing the opening 12.

Figure 7:
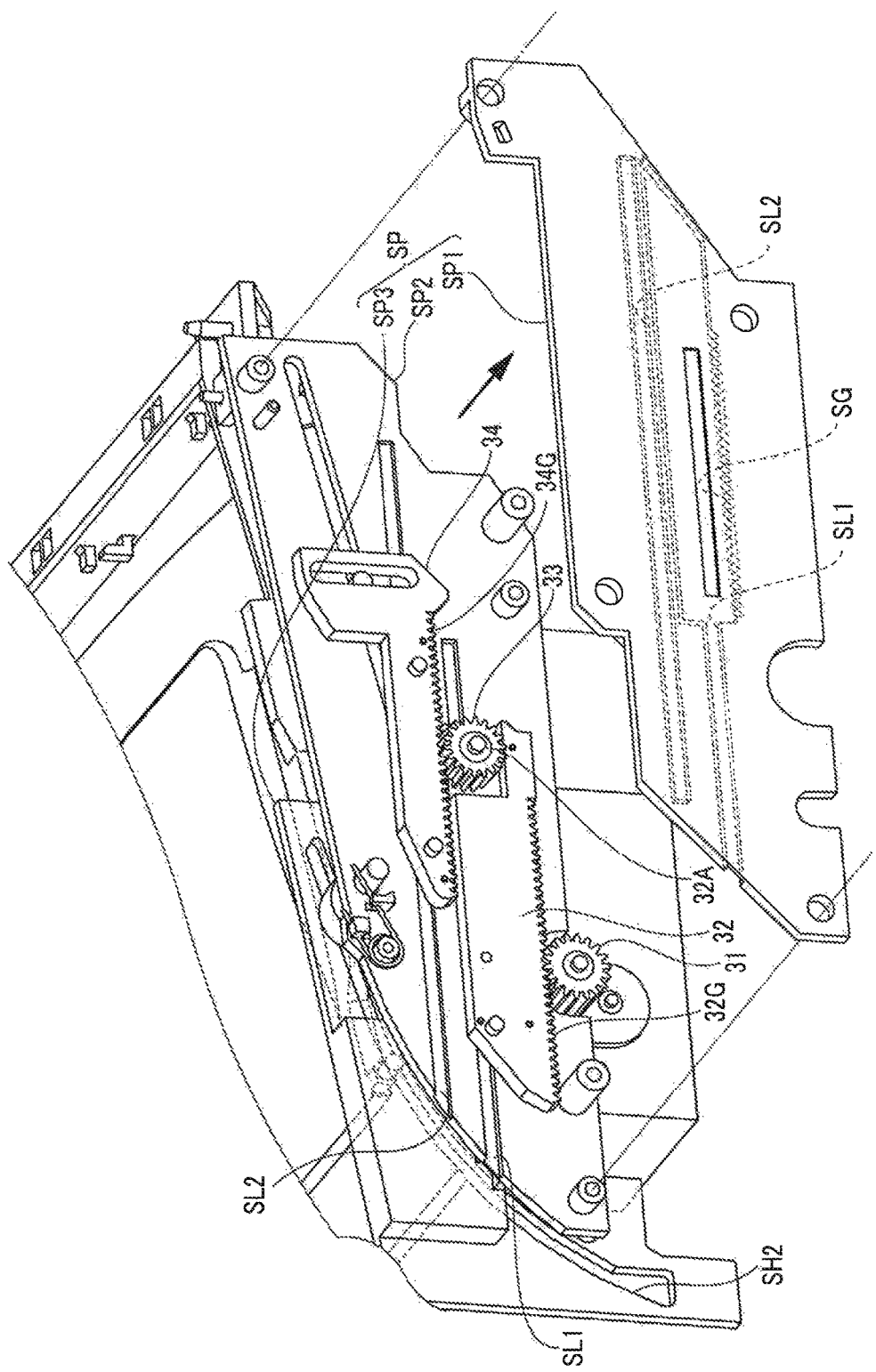
FIG. 7 is a perspective view showing details of the moving mechanism of the shutter of the display apparatus according to the first embodiment.
Figure 8:
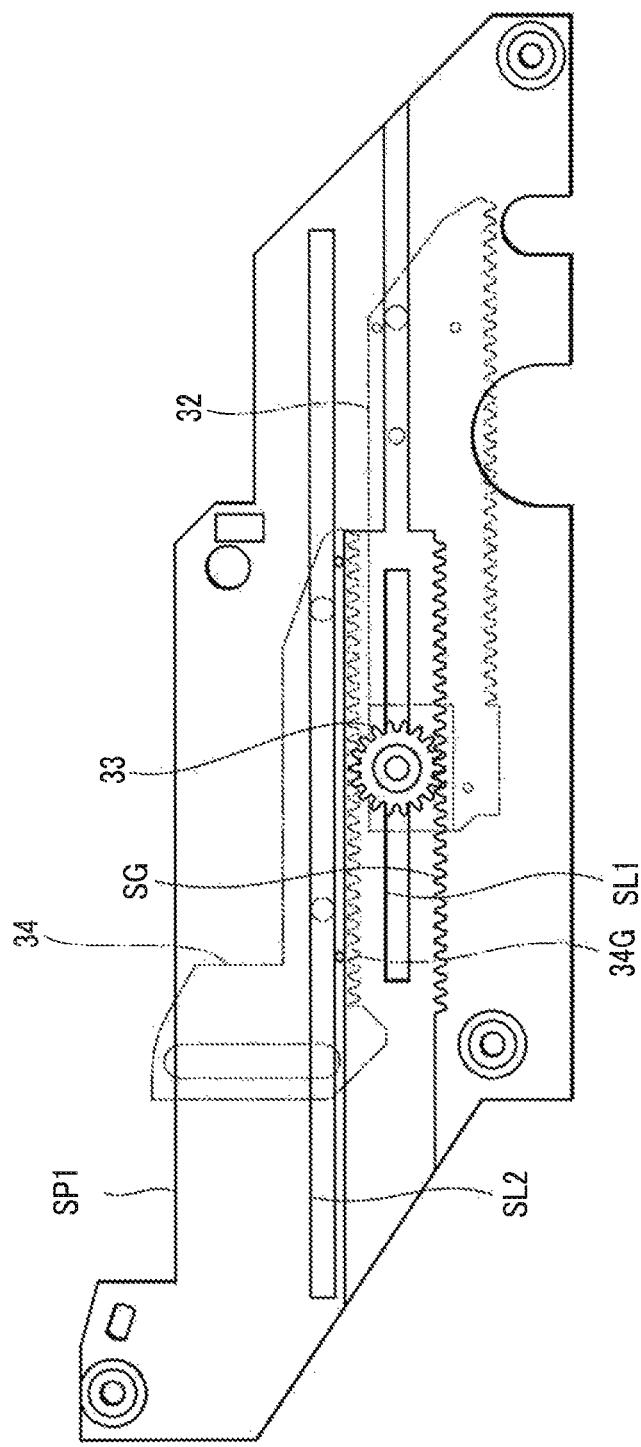
FIG. 8 is a perspective view showing details of the moving mechanism of the shutter of the display apparatus according to the first embodiment.

FIGS. 7 and 8 are diagrams showing a detailed structure of a moving mechanism 30. FIG. 7 is a partial enlarged perspective view of FIG. 5. For ease of understanding, FIG. 7 shows a first side plate SP1 of the side plate unit SP as disassembled from the other components in the direction of the arrow. FIG. 8 is a side view showing a side surface of the first side plate SP1 opposed to a second side plate SP2. In other words, FIG. 8 is a side view of the side surface of the first side plate SP 1 as seen from inside. For clarity of the drawing, in FIG. 8, the first and second slide members 32 and 34 are shown in two-dotted dashed lines, and the transmission member 33 is shown in solid lines.

As shown in FIG. 7, the first slide member 32 includes a first rack gear portion 32G which meshes with the first pinion gear 31. A second pinion gear 33 serving as the transmission member is fixed to one of the plurality of first slide pins 32A of the first slide member 32. The second pinion gear 33 slides with the first slide pin 32A. As shown in FIGS. 7 and 8, the side plate unit SP includes a third rack gear portion SG which meshes with the second pinion gear 33. This causes the second pinion gear 33 to make rotating motion. The second slide member 34 includes a second rack gear portion 34G which meshes with the second pinion gear 33.

Specifically, the rotation axis of the second pinion gear 33 slides according to the movement of the first slide member 32. In the present embodiment, the rotation axis of the second pinion gear 33 is located in the center of the first slide pin 32A. The second pinion gear 33 is rotated by the third rack gear portion SG. The sliding and rotating motion of the second pinion gear 33 is transmitted to the second rack gear portion 34G. The second slide member 34 thus makes a sliding movement by an amount of movement (stroke) greater than that of the first slide member 32.

In the present embodiment, as shown in FIG. 7, the side plate unit SP includes the first and second side plates SP1 and SP2 which are arranged to sandwich the first and second slide members 32 and 34 and the transmission member 33 therebetween. The second side plate SP2 is arranged on the inner side of the first side plate SP1. The side plate unit SP includes a third side plate SP3 which is provided on the inner side of the second side plate SP2. The side plate unit SP includes an outer side plate which is provided on the outer side of the first side plate SP1 and constitutes a side surface of the housing 11. In the present embodiment, the side plate units SP (side plates) are arranged in parallel with each other on the opposed both side surfaces of the housing 11.

In the present embodiment, the first and second slide rails SL1 and SL2 are provided on each of the first and second side plates SP1 and SP2. In the present embodiment, there are provided a total of four first slide pins 32A and a total of four second slide pins 34A, or twos on each of the first and second side plate SP1 and SP2 sides. The third rack gear portion SG is provided on the first side plate SP1. The second shutter rail SH2 is provided on the third side plate SP3.

Figure 9:
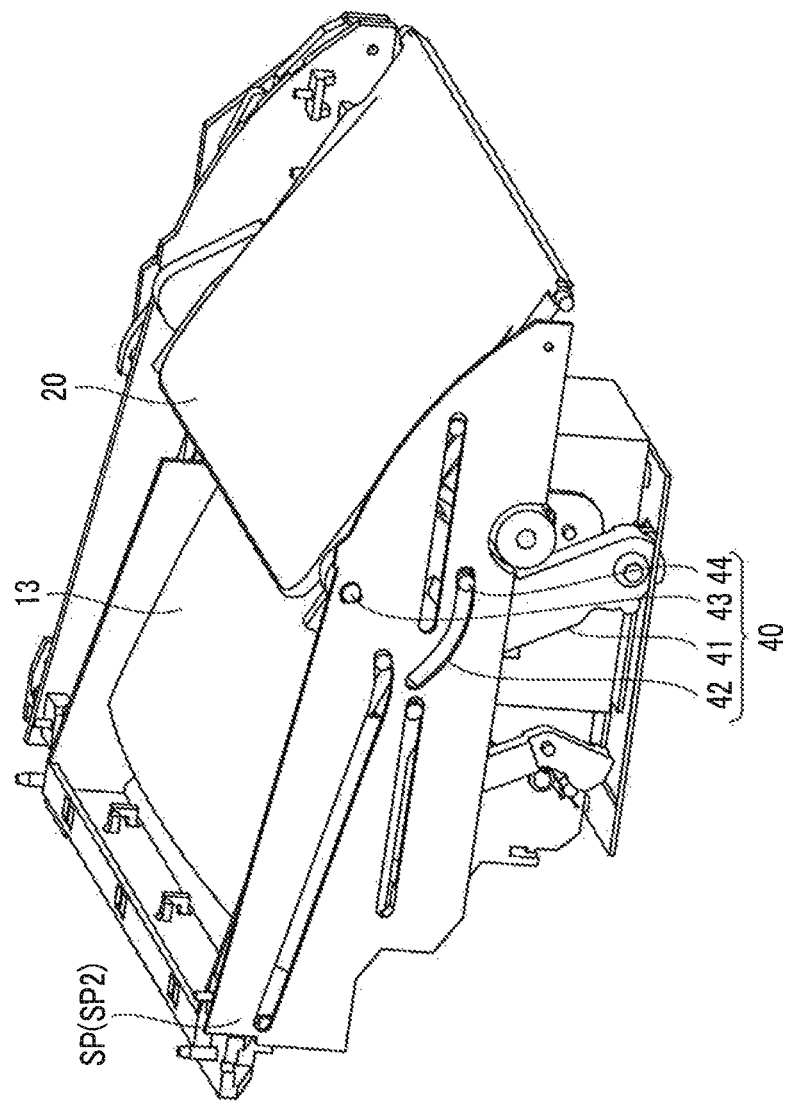
FIG. 9 is a perspective view of a rotating mechanism with a display member of the display apparatus according to the first embodiment at a retracted position.

FIGS. 9 and 10 are perspective views schematically showing a moving mechanism (rotating mechanism) 40 of the display member 13. FIG. 9 shows a state in which the display member 13 is retracted in the retracted position. FIG. 10 shows a state in which the display member 13 is developed in the developed position. In FIGS. 9 and 10, the side plate unit SP (second side plate SP2) on which the rotating mechanism 40 is provided is shown in a cross section taken along an xz plane. For clarity of the drawing, hatching of the second side plate unit SP2 is omitted.

As shown in FIGS. 9 and 10, the shutter 20 is stopped at the open position when the display member 13 moves. The display member 13 starts a development operation after the shutter 20 moves to the open position. The shutter 20 performs a closing operation after the display member 13 moves to the retracted position. For example, the switching of the movement of the shutter 20 and the display member 13 is performed by detecting the positions of the shutter 20 and the display member 13 by sensors provided on the side plate unit SP.

As shown in FIG. 9, at least either one of the opposed side plate units SP includes the rotating mechanism 40 for rotating the display member 13. More specifically, the rotating mechanism 40 includes a third rotating member (turning member) 41 provided on the side plate unit SP and a turning rail 42 provided on the side plate unit SP. The rotating mechanism 40 also includes a fulcrum pin 43 serving as a turning fulcrum of the display member 13, and a turning pin 44 inserted into the turning rail 41. The fulcrum pin 43 is fixed to the side plate unit SP (in the present embodiment, the second side plate SP2). The turning pin 44 turns along the turning rail 42 with the fulcrum pin 43 as the fulcrum. The rotating member 41 rotates along the turning track of the turning pin 44. The display member 13 rotates according to the rotation of the rotating member 41.

The display member 13 is retracted under the opening 12 when the shutter 20 is stopped at the closed position and when the shutter 20 is moving. The display member 13 moves (rises) from the retracted position (FIG. 9) to the developed position (FIG. 10) after the shutter 20 moves to the open position. In the present embodiment, the display member 13 passes through the opening 12 in the process of rotation. That is, the rotating mechanism 40 rotates and moves the display member 13 so that the display member 13 rotates while passing through the opening 12.

The rotating mechanism 40 may have a tilt function for fine adjusting the rotation angle (i.e., stop position) of the display member 13 at the developed position. The rotating mechanism 40 is driven by a driving source (not shown). In the present embodiment, the rotating mechanism 40 is driven by a driving source different from the driving source 16 of the moving mechanisms 30.

In the present embodiment, the display apparatus 10 includes the shutter 20 which moves in the depth direction of the top plate TP to open and close the opening 12. The moving mechanisms 30 of the shutter 20 include the first and second slide members 32 and 34 which move along the side plate units SP, and the transmission members 33 which transmit the amount of movement of the first slide members 32 to the second slide members 34 while the amount of movement. In other words, the moving mechanisms 30 include a stroke amplification mechanism (fast forward mechanism). This makes the moving mechanisms 30 compact. For example, if the display apparatus 10 including the moving mechanisms 30 is mounted on a vehicle, the space of the vehicle for the display apparatus 10 in the depth direction and the height direction of the housing 11 can be saved.

The space in the height direction of the housing 11 can be further saved by moving the first and second slide members 32 and 34 in the depth direction of the housing 11. In particular, if the display apparatus 10 is mounted on a vehicle, sufficient space is not always available for the display apparatus 10 since space needs to be ensured for other electronic parts constituting the vehicle. Even in such a case, the compact display apparatus 10 can be employed to enable on-vehicle implementation.

Since the moving mechanisms 30 are provided (integrated) on the side plate units SP of the housing 11, the space between the side plate units SP can be effectively used. For example, as shown in FIG. 3, the light source 14 and the reflection member 15 can be accommodated in the housing 11. In other words, the entire display apparatus 10 can be made compact. As shown in FIG. 3, the light source 14 is arranged under the moving path of the shutter 20. The optical path of the projection light PL to the display member 13 can thus be made long.

As shown in FIG. 3, the light source 14 is arranged behind the display member 13 in the depth direction of the housing 11. The reflection member 15 is arranged in front of the display member 13 in the depth direction of the housing 11. If the projection light PL is reflected inside the housing 11 by using the light source 14 and the reflection member 15 in such an arrangement, a relatively long optical path can be formed inside the housing 11. The longer the optical path to the display member 13, the farther behind the display member 13 the virtual image can be formed. For example, the movement of the line of sight of the vehicle's driver to the display member 13 can thus be reduced to suppress the burden on the driver. A display apparatus 10 that is not only capable of space saving but also reduces the burden on the driver can thus be provided.

Moving the display member 13 by the rotating mechanism (turning mechanism) 40 provided on the side plate unit SP allows additional space saving. Specifically, the rotation mechanism can be implemented by a simple configuration. In the present embodiment, the moving mechanisms 30 of the shutter 20, which need to produce a relatively large amount of movement (stroke), use a fast forward mechanism. Meanwhile, the display member 13, of which the movement is completed by a relatively small amount of movement, uses the rotating mechanism 40. The shutter 20 and the display member 13 can thus be moved with space saved.

The opening 12 is not only used as the moving path of the display member 13 but also used as the optical path of the irradiation light PL to the display member 13. This allows space saving, compared to when two separate openings are formed. In addition, the optical path to the display member 13 can be formed with a large sectional area, so that the irradiation light PL can be made incident on the entire display member 13. The entire incident surface of the irradiation light PL on the display member 13 can thus be used as a display area (irradiation area). This can increase the size of the virtual image and increase the amount of information to be displayed.

In consideration of improving the display area and display quality, the opening 12 preferably has a large size. However, this also increases the size of the shutter 20. In consideration of minimizing the moving path of the display member 13 in the housing 11, the display member 13 is preferably configured to pass through the opening 12 in the process of rotation as shown in FIGS. 9 and 10. Considering the arrangement and moving path of the display member 13, the size of the opening 12 increases. However, the provision of the compact moving mechanisms like the moving mechanisms 30 suppresses an increase in the size of the display apparatus 10 (size in the height direction in particular).

In the present embodiment, the moving mechanisms 30 of the shutter 20 are described to be constituted by a combination of rack mechanisms and pinion mechanisms. However, the moving mechanisms 30 of the shutter 20 are not limited thereto. The moving mechanisms 30 are also described to include the first and second slide members 32 and 34 and the transmission members 33. However, the configuration of the moving mechanisms 30 is not limited thereto. For example, if an intermediate slide member is provided between the first and second slide members 32 and 34, and pinion gears are provided therebetween, the amount of movement can be amplified in three stages.

While the moving ends of the shutter 20 are described to make up and down motion and a rotating movement, the moving path of the shutter 20 is not limited thereto. The shutter 20 may be configured to open and close the opening 12 by moving in the depth direction of the housing 11.

While the display member 13 is described to be rotated, the moving mode of the display member 13 is not limited thereto. If the moving mechanisms 30 of the shutter 20, which tend to be relatively large in size, include a fast forward mechanism, the moving mechanisms 30 themselves are reduced in size. This allows, for example, a certain degree of space saving inside the vehicle. The details of the rotating mechanism 40 of the display member 13 are merely an example.

In the present embodiment, the display apparatus 10 includes the housing 11 which includes the top plate TP having the opening 12, the side plate units SP which extend in the depth direction of the housing 11 and are opposed to each other, the display member 13 which can move between the retracted position at which the display member 13 is retracted in the housing 11 and the developed position at which the display member 13 is protruded from the opening 12, the shutter 20 which moves in the depth direction of the housing 11 to open and close the opening 12, and a moving mechanism 30 which is provided on at least either one of the opposed side plate units SP and moves the shutter 20. The opening 12 forms the optical path of the irradiation light PL to the display member 13. The moving mechanism 30 includes the first and second slide members 32 and 34 which move along the at least one side plate unit SP, and the transmission member 33 which amplifies and transmits the amount of movement of the first slide member 32 to the second slide member 34. The shutter 20 moves according to the movement of the second slide member 34. The moving space of the shutter 20 can thus be reduced as much as possible. Consequently, for example, a high quality display apparatus that can save space inside the vehicle can be provided.

REFERENCE SIGNS LIST 10 display apparatus
11 housing
TP top plate
12 opening
SP side plate unit
13 display member
20 shutter
30 moving mechanism
32 first slide member
33 transmission member
34 second slide member

The invention claimed is:
1. A display apparatus comprising:
a housing including a top plate having an opening and two opposed side plate units;
a display member capable of moving through said opening;

a shutter configured to open and close said opening; and
a moving mechanism provided on a surface of one side plate unit opposed to another side plate unit of said two side plate units, wherein
said moving mechanism comprises,
a first pinion gear rotatable by a driving source,
a first slide member having a first rack gear portion that meshes with said first pinion gear,
a second pinion gear having a rotation axis that slides according to a movement of said first slide member, and
a second slide member having a second rack gear portion that meshes with said second pinion gear,
wherein said shutter moves according to movement of the second slide member.

2. The display apparatus according to claim 1, wherein said display member is capable of moving between a retracted position at which said display member is retracted in said housing and a developed position at which said display member is protruded from said opening.

3. The display apparatus according to claim 1, wherein said first and second slide members move in a depth direction of said housing.

4. The display apparatus according to claim 1, comprising a rotating mechanism provided on at least one of said opposed side plate units, said rotating mechanism being configured to rotate said display member.

5. The display apparatus according to claim 4, wherein said rotating mechanism rotates said display member so that said display member rotates while passing through said opening.

6. The display apparatus according to claim 1, comprising:
a light source provided under a moving path of said shutter, said light source generating irradiation light; and
a reflection member accommodated in said housing, said reflection member reflecting the irradiation light toward said display member, wherein
the irradiation light passes through said opening.

7. The display apparatus according to claim 6, wherein:
said light source is arranged behind said display member in a depth direction of said housing; and
said reflection member is arranged in front of said display member in the depth direction.

8. The display apparatus according to claim 1, wherein said one side plate unit has a third rack gear portion that meshes with said second pinion gear.

9. The display apparatus according to claim 1, wherein:
said side plate units comprise a pair of rails opposed to each other and engaging with said shutter;
each rail of said pair of rails are at least partially extends in an arc shape; and
said shutter moves on an arcuate track along said pair of rails according to movement of the second slide member.

* * * * *